US011126535B2

(12) United States Patent
Shin et al.

(10) Patent No.: US 11,126,535 B2
(45) Date of Patent: Sep. 21, 2021

(54) GRAPHICS PROCESSING UNIT FOR DERIVING RUNTIME PERFORMANCE CHARACTERISTICS, COMPUTER SYSTEM, AND OPERATION METHOD THEREOF

(71) Applicant: SAMSUNG ELECTRONICS CO., LTD., Suwon-si (KR)

(72) Inventors: Young-sam Shin, Hwaseong-si (KR); Dong-hoon Yoo, Suwon-si (KR); Jeong-joon Yoo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/529,926

(22) Filed: Aug. 2, 2019

(65) Prior Publication Data

US 2020/0210317 A1 Jul. 2, 2020

(30) Foreign Application Priority Data

Dec. 31, 2018 (KR) ........................ 10-2018-0174223

(51) Int. Cl.
 *G06T 15/00* (2011.01)
 *G06F 11/36* (2006.01)
 *G06F 8/41* (2018.01)
(52) U.S. Cl.
 CPC ............ *G06F 11/3612* (2013.01); *G06F 8/41* (2013.01); *G06T 15/005* (2013.01)
(58) Field of Classification Search
 CPC combination set(s) only.
 See application file for complete search history.

(56) References Cited

U.S. PATENT DOCUMENTS

| 7,692,660 | B2 | 4/2010 | Markovic et al. |
| 7,962,314 | B2 | 6/2011 | Chernoff |
| 8,296,738 | B1* | 10/2012 | Kiel ................... G06F 11/3624 717/127 |
| 8,375,368 | B2 | 2/2013 | Tuck et al. |
| 9,064,052 | B1* | 6/2015 | Bienkowski ........ G06F 11/3692 |
| 9,189,881 | B2 | 11/2015 | Galazin et al. |
| 9,196,013 | B2 | 11/2015 | Hendry et al. |
| 9,799,087 | B2 | 10/2017 | Fam et al. |
| 2008/0007559 | A1* | 1/2008 | Kalaiah ................ H04N 13/275 345/501 |
| 2008/0266302 | A1* | 10/2008 | Andre ................. G06F 13/4234 345/519 |

(Continued)

FOREIGN PATENT DOCUMENTS

EP 1 177 531 B1 1/2004

*Primary Examiner* — Andrew G Yang
(74) *Attorney, Agent, or Firm* — Sughrue Mion, PLLC

(57) ABSTRACT

A computing system is provided. The computing system includes: a memory configured to store a shader program; and a graphics processing unit (GPU) configured to obtain the shader program stored in the memory in a profile mode, the GPU being configured to perform: inserting, into the shader program, one or more monitor associative codes; compiling the shader program, into which the one or more monitor associative codes are inserted, into a language that is capable of being processed by a plurality of cores; and obtaining a runtime performance characteristic of the shader program by executing the compiled shader program and the one or more monitor associative codes.

18 Claims, 12 Drawing Sheets

(56) References Cited

U.S. PATENT DOCUMENTS

| | | | |
|---|---|---|---|
| 2013/0106880 A1* | 5/2013 | Williams | G06T 1/00 |
| | | | 345/522 |
| 2017/0212563 A1 | 7/2017 | Farazmand et al. | |
| 2018/0165200 A1* | 6/2018 | Sethuraman | G06F 11/30 |
| 2019/0139183 A1* | 5/2019 | Goldman | G06F 11/3624 |
| 2019/0213706 A1* | 7/2019 | Goldman | G06F 9/5055 |

* cited by examiner

GRAPHICS PROCESSING UNIT FOR DERIVING RUNTIME PERFORMANCE CHARACTERISTICS, COMPUTER SYSTEM, AND OPERATION METHOD THEREOF

CROSS-REFERENCE TO THE RELATED APPLICATION(S)

This application claims priority from Korean Patent Application No. 10-2018-0174223, filed on Dec. 31, 2018, in the Korean Intellectual Property Office, the disclosure of which is herein incorporated by reference in its entirety.

BACKGROUND

1. Field

The example embodiments relate to a graphics processing unit (GPU), and more particularly, to a GPU for deriving runtime performance characteristics, a computer system, and an operation method thereof.

2. Description of the Related Art

Graphics processing units (GPUs) process graphics application programming interface (API) such as OpenGL, OpenCL or Vulkan, thereby implementing various graphics effects in a variety of electronic devices. A program should be edited according to predetermined rules of a standard API so that the program may be processed in a GPU. The program to be processed in the GPU may include a vertex shader, a geometry shader, and a pixel shader, which are used for image generation.

The vertex shader, the geometry shader, and the pixel shader are compiled and linked and are used in the program. The GPU executes the program in a plurality of cores (or a plurality of threads) in a parallel manner, for example, in the form of pieces of single instruction multiple data (SIMD). In this case, it may not be easy to perform monitoring of runtime characteristics of an individual shader program in the GPU.

SUMMARY

One or more example embodiments provide a method of deriving runtime performance characteristics of a graphics processing unit (GPU), and more particularly, a GPU including a compiler for inserting monitor associative codes during compiling, a computer system, and an operation method thereof.

According to an aspect of an example embodiment, there is provided a computing system including: a memory configured to store a shader program; and a graphics processing unit (GPU) configured to obtain the shader program stored in the memory in a profile mode, the GPU being configured to perform: inserting, into the shader program, one or more monitor associative codes; compiling the shader program, into which the one or more monitor associative codes are inserted, into a language that is capable of being processed by a plurality of cores; and obtaining a runtime performance characteristic of the shader program by executing the compiled shader program and the one or more monitor associative codes.

According to an aspect of an example embodiment, there is provided a method of operating a computing system, the method including: outputting a shader program including a plurality of code blocks, in response to a profile command including a graphics command; inserting monitor associative codes into each of at least part of the plurality of code blocks; compiling the shader program, into which the monitor associative codes are inserted; obtaining a runtime performance characteristic of the shader program by executing the plurality of code blocks and the monitor associative codes in a plurality of cores; recording the obtained runtime performance characteristic of the shader program in a memory shared by the plurality of cores; and outputting the recorded runtime performance characteristic of the shader program in response to termination of the shader program.

According to an aspect of an example embodiment, there is provided a graphics processing unit (GPU) including: a compiler configured to receive a program including a plurality of code blocks, the compiler including a monitor associative code injector configured to insert one or more monitor associative codes into each of at least part of the plurality of code blocks, and configured to compile the one or more monitor associative codes and the program in a profile mode; a plurality of cores configured to perform the compiled program and the one or more monitor associative codes in a parallel manner and configured to obtain a runtime performance characteristic of the program based on execution of the one or more monitor associative codes; and a shared memory configured to store the obtained runtime performance characteristic of the program.

BRIEF DESCRIPTION OF THE DRAWINGS

The above and/or other aspects will be more apparent by describing certain example embodiments with reference to the accompanying drawings, in which.

DETAILED DESCRIPTION

Hereinafter, embodiments of the disclosure will be described in more detail with reference to the accompanying drawings.

Figure 1:
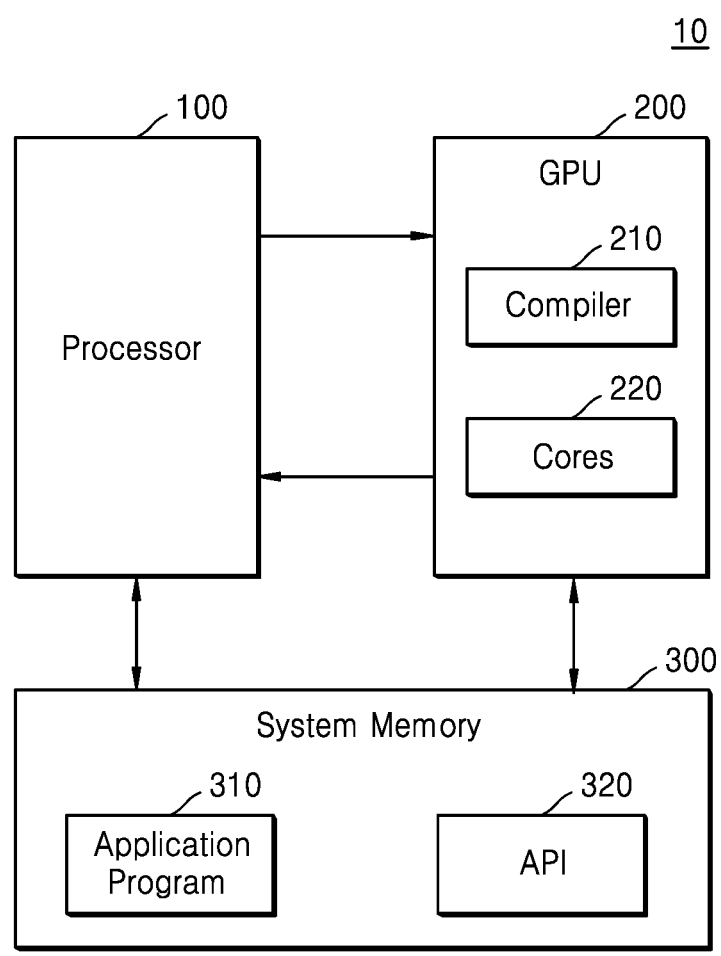
FIG. 1 is a block diagram illustrating a computing system according to an example embodiment.

FIG. 1 is a block diagram illustrating a computing system 10 according to an example embodiment. Referring to FIG.

1, the computing system 10 may include a processor 100, a graphics processing unit (GPU) 200, and a system memory 300. Although not shown in FIG. 1, the computing system 10 may further include a display, an input/output interface, and a system bus.

The computing system 10 may refer to an arbitrary computing system including the GPU 200. The computing system 10 may be, as a non-limiting example, a stationary computing system, such as a desktop computer, a server, a television settop box, a video game console or a portable computing system, such as a laptop computer, a mobile phone, a wearable device, a portable media player, a table personal computer (PC), an e-book reader, etc.

The processor 100 may receive user input from outside. Also, the processor 100 may execute a series of commands (or programs) stored in the system memory 300, may process data stored in the system memory 300, and may allow a certain task in a graphics pipeline to be performed by the GPU 200. In some embodiments, the processor 100 may include two or more cores.

In some embodiments, the processor 100 and the GPU 200 may be integrated circuits (ICs). For example, the ICs may be at least part of a processing chip within a chip package and a system on chip (SoC). In an example, the processor 100 and the GPU 200 may be implemented in different ICs (or different chip packages). In another example, the processor 100 and the GPU 200 may also be implemented in a single IC (or a single chip package).

The system memory 300 may include one or more computer-readable storage media. The system memory 300 may be used to transport or store desired program code in the form of a command and/or data structure and may include arbitrary media that may be accessed by the processor 100 or the GPU 200. For example, the system memory 300 may include, in some embodiments, a volatile memory, such as dynamic random access memory (DRAM), static random access memory (SRAM), mobile DRAM, double data rate synchronous dynamic random access memory (DDR SDRAM), low power DDR (LP DDR) SDRAM, graphics DDR (GDDR) SDRAM, or rambus dynamic random access memory (RDRAM), and in some embodiments, may include a nonvolatile memory, such as electrically erasable programmable read-only memory (EEPROM), a flash memory, phase change random access memory (PRAM), resistance random access memory (RRAM), nano floating gate memory (NFGM), polymer random access memory (PoRAM), magnetic random access memory (MRAM), and ferroelectric random access memory (FRAM).

In some embodiments, the system memory 300 may be a non-transitory storage medium. The term "non-transitory" may mean that a storage medium is not implemented with a carrier wave or a propagated signal. However, the term "non-transitory" does not mean that the system memory 300 is not moved or a stored content is static. In an example, the system memory 300 may be removed from the computing system 10 and moved to another system (or device).

The system memory 300 may include an application program 310 and/or an application program interface (API) 320. The application program 310 may generate calls for the API 320 so as to generate desired results in the form of a sequence of graphics images, for example.

The application program 310 may be driven by the processor 100, and the processor 100 may offload part of a task relevant to the application program 310 into the GPU 200. For example, the processor 100 may offload a task that requires a massive parallel operation, for example, a graphics processing task, into the GPU 200.

The processor 100 may communicate with the GPU 200 based on the API 320 when offloading the task. For example, the API 320 may include at least one of DirectX API, OpenGL API, OpenCL API, and Vulkan API. In another example, it will be understood by those skilled in the art that the processor 100 may communicate with the GPU 200 using any other arbitrary communication technology that is not based on the API 320.

The GPU 200 may receive commands provided by the processor 100 and may perform a parallel operation relevant to various tasks. The GPU 200 may include a compiler 210 and a plurality of cores 220. For example, the GPU 200 may receive a shader program from the processor 100 and may convert the shader program into a language that may be processed using the plurality of cores 220, for example, a machine language, using the compiler 210. The shader program that is an algorithm for generating a color change of an object may refer to a unit or shape of software or firmware to be executed on the GPU 200. In an example embodiment, the shader program may include a plurality of code blocks. The shader program may include a plurality of code blocks. For example, the plurality of code blocks may be a unit of codes to be sequentially executed without waiting for an external resource and/or branching into another code. A detailed description thereof will be provided later.

For example, the processor 100 may execute an application program such as a video game, and thus may generate graphics data. The processor 100 may output the graphics data to the GPU 200, and the GPU 200 may process the graphics data according to the graphics pipeline. For example, the GPU 200 may execute one or more shader programs so as to process the graphics data.

Hereinafter, example embodiments are described based on the shader program. However, this is just for convenience of explanation, and it will be understood by those skilled in the art that the disclosure applies to other programs, for example, a deep-learning-related program, a block chain-related program, and a general purpose computing program other than the shader program.

In an example embodiment, the GPU 200 may operate in a profile mode based on an instruction of the program 100 and thus may measure runtime characteristics of the shader program. The profile mode may be a mode in which performance characteristics of each of the shader program are derived and execution of the shader program is identified based on the derived performance characteristics of each shader program. For example, the runtime characteristics may be driving characteristics of the shader program in a real shader program driving environment and may indicate characteristics in which access to the external resource or branching of codes are considered.

In an example embodiment, in the profile mode, the compiler 210 may insert monitor associative codes into at least part of the plurality of code blocks included in the shader program. In an example, the monitor associative codes may be monitor codes that are codes for monitoring performance characteristics of a corresponding code block. In another example, the monitor associative code may be branch codes that instruct to branch into monitor codes for monitoring the performance characteristics of the code block. In an example embodiment, the monitor code may derive information such as, for example but not limited to, a shader program number, a time stamp, mask execution, a resource score board, branch conditions satisfaction/non-satisfaction, an invocation count, the types of request resources, and the types of usage resources through a monitoring operation and may store the derived information in a memory, for example, a buffer. A detailed description thereof will be provided later.

Figure 2:
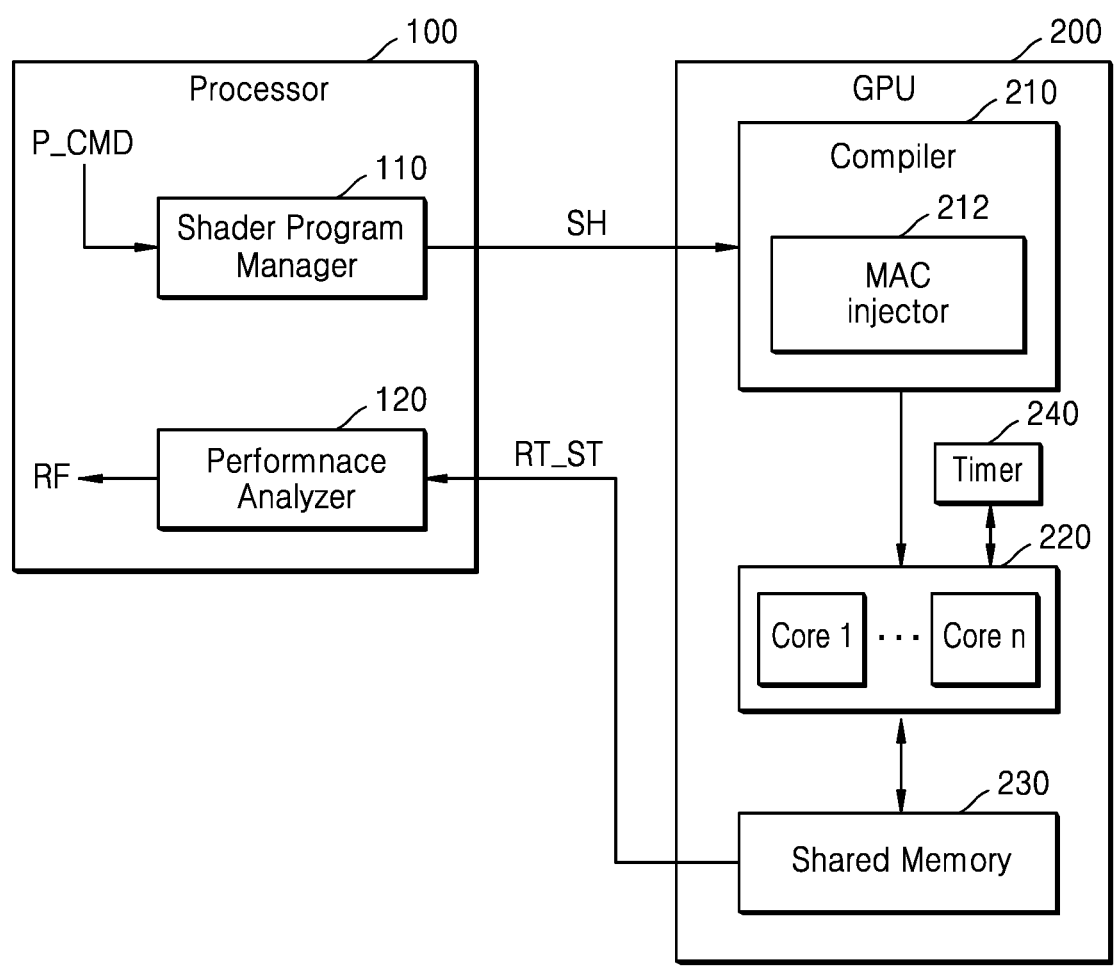
FIG. 2 is a block diagram illustrating an operation in a profile mode according to an example embodiment.

FIG. 2 is a block diagram illustrating an operation in a profile mode according to an example embodiment.

Referring to FIG. 2, the processor 100 may include a shader program manager 110 and a performance analyzer 120. The shader program manager 110 may output the shader program SH to the GPU 200 based on an input graphics command. In an example, the shader program manager 110 may receive the graphics command required to drive the application program 310, may select the shader program SH stored in the system memory 300 based on the received graphics command, and may output the selected shader program to the GPU 200.

In an example embodiment, the shader program manager 110 may receive a program mode command P_CMD and may output a variety of signals so that the GPU 200 may operate in the profile mode based on the received program mode command P_CMD. The profile mode that is a mode for measuring the performance of the GPU 200 may include a graphics command. The shader program manager 110 may output the shader program SH in response to the profile mode command P_CMD, and the GPU 200 may monitor runtime performance characteristics with respect to the shader program SH.

In an example embodiment, the performance analyzer 120 may receive a runtime performance characteristics list RT_ST from the GPU 200 and may extract performance data PF about each of shader programs based on the received runtime performance characteristics list RT_ST. For example, the performance analyzer 120 may receive and analyze the performance characteristics list RT_ST of each shader program stored in a shared memory 230 of the GPU 200. The performance analyzer 120 may analyze at least one of a total performance time for a shader program, the efficiency of the shader program, instruction issue-efficiency, and a statistics value regarding whether branching conditions are satisfied for each branch point, based on the performance characteristics list RT_ST.

The GPU 200 may include a compiler 210, a plurality of cores 220, a shared memory 230, and a timer 240. The compiler 210 may convert a variety of signals received from the shader program manager 110 into the form that may be performed by the plurality of cores 220, for example, the form of a machine language. For example, the compiler 210 may perform compiling of the shader program SH using the shader program received from the shader program manager 110 as source code, thereby generating a shader program having the form that may be executed in each of the plurality of cores 220. For example, the compiler 210 may perform compiling using a plurality of instruction set architectures (ISAs).

The compiler 210 may include a monitor associative code injector 212. In an example embodiment, the compiler 210 may insert the monitor associative code into part of the shader program SH using the monitor associative code injector 212 when a compiling operation is performed in the profile mode. In an example, the monitor associative code injector 212 may insert the monitor associative code into at least part of the code blocks included in the shader program SH. The monitor associative code injector 212 may insert the monitor associative code into a code block that requires monitoring of the runtime performance characteristics among the code blocks.

In an example, the monitor associative code injector 212 may insert the monitor associative code at a starting point or ending point of the code block. In another example, the monitor associative code injector 212 may insert the monitor associative code at a point at which the result of monitoring may be obtained immediately after branch codes are performed. The branch codes may be a conditional statement, for example, an if-statement. In another example, the monitor associative code injector 212 may insert the monitor associative code at a point at which the complier 210 has access to an external resource.

In an example embodiment, the monitor associative codes may include monitor codes that are codes for directly monitoring performance characteristics of a code block in which the monitor associative codes are included, and recording the result of monitoring in the shared memory 230. For example, when the number of codes for monitoring is comparatively small, the monitor associative code injector 212 may insert the monitor code as the monitor associative code into the code block. However, embodiments are not limited thereto.

In another example embodiment, the monitor associative code may be branch codes that instruct to branch into monitor codes for monitoring the performance characteristics of the code block and recording the result of monitoring in the shared memory 230. For example, when the number of codes for monitoring is comparatively large, the monitor associative code injector 212 may insert the branch code as the monitor associative code into the code block. However, embodiments are not limited thereto.

In an example embodiment, the monitor code inserted into the monitor associative code injector 212 may derive information such as, for example but not limited to, a shader program number, a time stamp, mask execution, a resource score board, branching condition satisfaction/non-satisfaction, an invocation count of the shader program, the types of request resources, and the types of usage resources through the monitoring operation of the runtime performance characteristics and may store the derived information in the shared memory 230. In an example, when a particular code block is performed on one of the plurality of cores 220, the monitor code may derive a time stamp based on time information received from the timer 240.

The shared memory 230 may store data generated while a variety of instructions including the shader program SH received from the processor 100 are processed. For example, as the shader program SH is executed in the plurality of cores 220, image data may be generated. The image data may be buffered in the shared memory 230 and then may be transmitted to the processor 100, for example.

In an example embodiment, runtime performance characteristics of each shader program SH according to the monitor associative code may be stored in the shared memory 230. For example, the shared memory 230 may include a render buffer region divided in a unit of a draw call. The monitor code may record the runtime performance characteristics derived according to performance of the shader program SH in the render buffer region that corresponds to the draw call to which the corresponding shader program SH belongs. In an example embodiment, in response to termination of execution of all of shader programs, the shared memory 230 may output the recorded runtime performance characteristics RT_ST to the processor 100. In another example embodiment, the processor 100 may output an additional signal that requests the runtime performance characteristics list RT_ST to the GPU 200, and the shared memory 230 may output the runtime performance characteristics list RT_ST to the processor 100 based on the output additional signal.

A GPU according to the disclosure may insert a monitor associative circuit (or a monitor associative code) during compiling, thereby easily monitoring runtime performance characteristics in the GPU that executes a program in a parallel manner. Also, a computing system including the GPU according to the disclosure may derive runtime performance characteristics in a real program driving environment and may perform performance analysis based on the derived runtime performance characteristics, thereby improving accuracy in profiling. Also, in a monitoring operation according to the disclosure, a shader program is performed during time that otherwise would have been wasted due to waiting for a shared resource. Accordingly, profiling of the shader program may be performed at a comparatively high speed.

Figure 3:
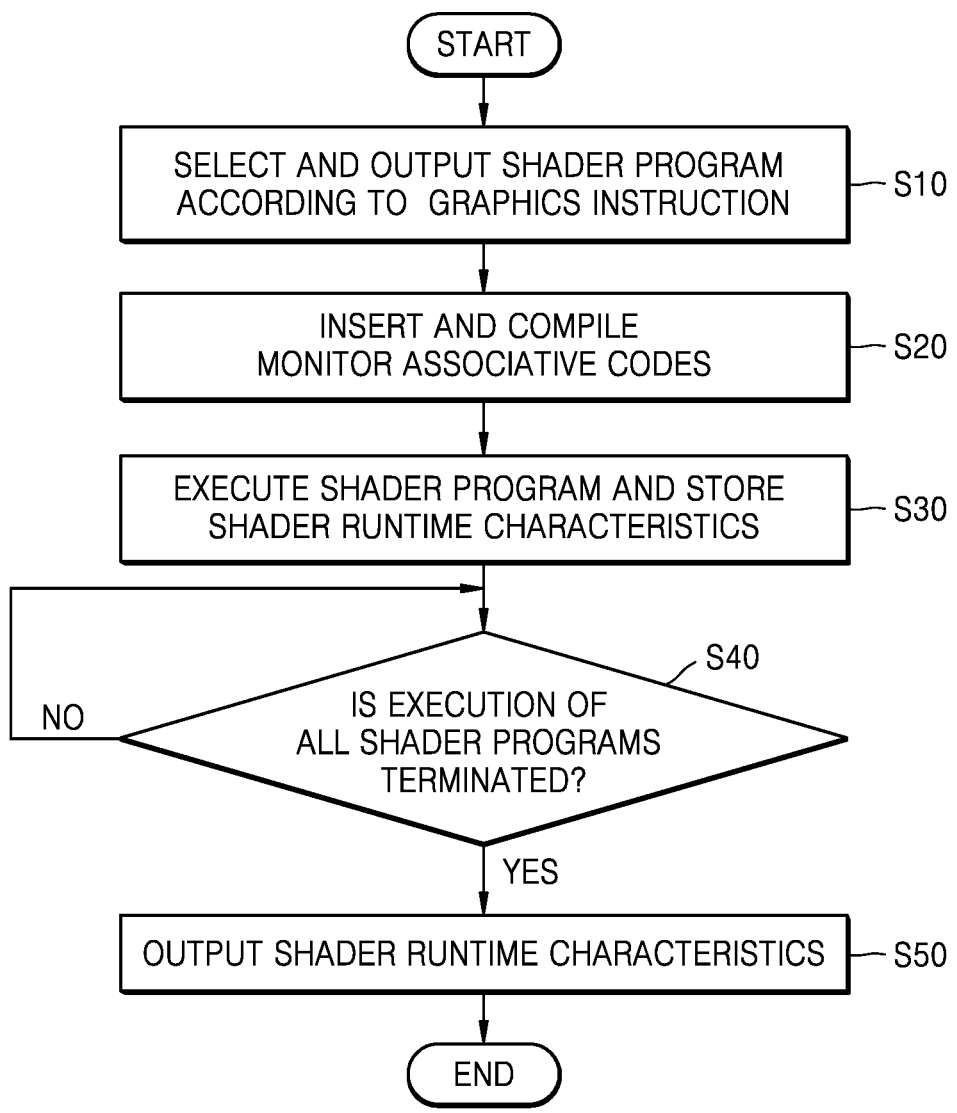
FIG. 3 is a flowchart illustrating an operation of a computing system in a profile mode, according to an example embodiment.

FIG. 3 is a flowchart illustrating an operation of a computing system in a profile mode, according to an example embodiment.

Referring to FIG. 3, the processor 100 may select the shader program SH according to a graphics instruction and may output the selected graphics instruction (operation S10). For example, the processor 100 may select the shader program SH included in the system memory 300 using the shader program manager 110 based on the graphics instruction included in the input profile mode command P_CMD and may output the selected shader program SH to the GPU 200.

The GPU 200 may insert the monitor associative code into the received shader program SH and may perform compiling (operation S20). For example, the compiler 210 that receives the shader program SH may insert a plurality of monitor associative codes into the shader program SH using the monitor associative code injector 212. The compiler 210 may compile the shader program into which the monitor associative code is inserted, thereby converting the shader program into the form that may be executed in the plurality of cores 220. In another example, the monitor associative code injector 212 may perform compiling of the shader program SH and then may also insert the monitor associative code in a compiled format.

The GPU 200 may execute the shader program including the monitor associative code and thus may store derived shader runtime characteristics (operation S30). The GPU 200 may drive the shader program including the monitor associative code to be parallel to the plurality of cores 220. For example, in the plurality of cores 220, the shader program may be executed in a parallel manner in a single instruction multiple data (SIMD) manner. The GPU 200 may store, in the shared memory 230, the runtime performance characteristics of the shader program derived by execution of the monitor associative code. For example, the GPU 200 may record the runtime performance characteristics of the corresponding shader program included in the shared memory 230 in the render buffer region that corresponds to a draw call to which the shader program belongs.

The GPU 200 may determine whether execution of all of shader programs received from the processor 100 is terminated (operation S40). When a shader program to be executed remains, the GPU 200 may execute the remaining shader program in the plurality of cores 220.

When execution of all of shader programs is terminated, the GPU 200 may output the shader runtime characteristics list RT_ST to the processor 100 (operation S50). The shader runtime characteristics list RT_ST may include runtime performance characteristics about each of the shader programs. For example, the shared memory 230 may store the runtime characteristics list RT_ST including the runtime characteristics derived from the monitor associative code and may output the runtime characteristics list RT_ST to the processor 100 in response to termination of execution of all of shader programs. In an example embodiment, the processor 100 may generate performance data PF about each shader program based on the runtime characteristics list RT_ST using the performance analyzer 120. The performance data PF may reflect the runtime performance characteristics having improved accuracy, thereby providing profiling having improved performance.

Figure 4:
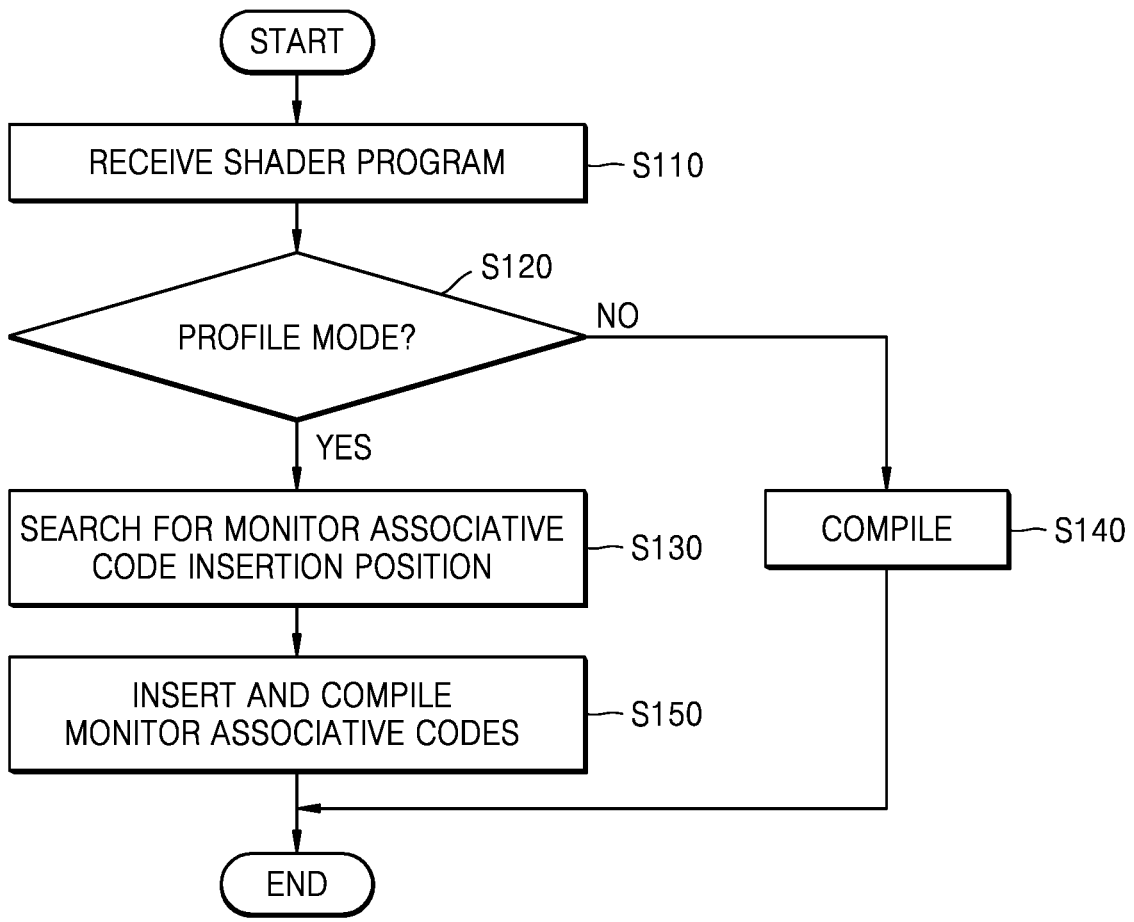
FIG. 4 is a flowchart illustrating an operating of a compiler according to an example embodiment.

FIG. 4 is a flowchart illustrating an operating method of a compiler according to an example embodiment.

Referring to FIG. 4, a compiler 210 may receive a shader program SH (operation S110). For example, the shader program SH may be selected and output by the shader program manager 110.

The compiler 210 may determine whether the compiler 210 operates in a present profile mode, based on a signal received from the processor 100 (operation S120). For example, the processor 100 may include a profile mode-related signal in an output of the shader program SH and may output the profile mode-related signal together with the output of the shader program SH, and the compiler 210 may determine whether a present mode is the profile mode, based on the profile mode-related signal. Alternatively, the processor 100 may output a separate profile mode-related signal, and the compiler 210 may determine whether the present mode is the profile mode, based on the separate profile mode-related signal.

In response to determination that the present mode is not the profile mode, the compiler 210 may perform a compiling operation of the received shader program SH (operation S140). On the other hand, in response to determination that the present mode is the profile mode, the compiler 210 may search for an insertion position of the monitor associative code (operation S130). In an example embodiment, the compiler 210 may search for an insertion position of the monitor associative code in a unit of a code block that constitutes the shader program SH. For example, the code block may be a set unit of codes to be sequentially executed without waiting for an external resource and/or branching into another code. For example, the compiler 210 may search for a starting point or an ending point of the code block as an insertion position. In another example, the compiler 210 may search for a point where the result of monitoring immediately after branch codes such as a conditional statement are executed, may be obtained and determine the searched point as an insertion position. In another example, the compiler 210 may search for a point in which the compiler 210 has access to an external resource, as an insertion position.

The compiler 210 may insert a plurality of monitor associative codes into the shader program SH according to the found monitor associative code insertion position and may compile the shader program SH (operation S150). However, embodiments are not limited thereto. The compiler 210 may compile the shader program SH and then may insert the monitor associative codes in the compiled format into the position found in operation S130. An operation of searching for the monitor associative code insertion position and an operation of inserting the monitor associative code may be performed by the monitor associative code injector 212 included in the compiler 210, for example.

Figure 5:
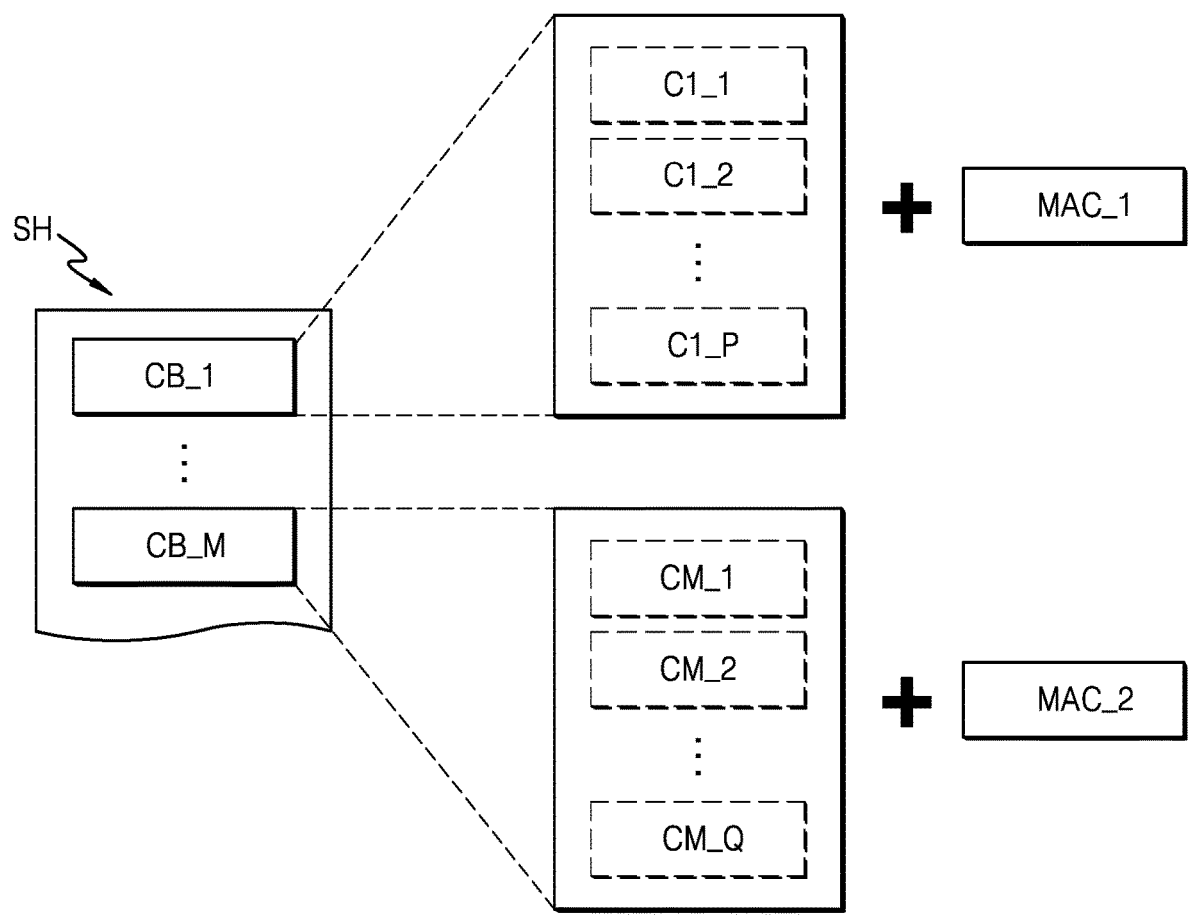
FIG. 5 is a view illustrating inserting of monitor associative codes according to an example embodiment.

FIG. 5 is a view illustrating inserting of monitor associative codes according to an example embodiment.

Referring to FIG. 5, the shader program SH may include a plurality of code blocks CB_1 to CB_M (where M is a positive integer equal to or greater than 2). Each of the plurality of code blocks may include a plurality of codes. For example, the first code block CB_1 may include P codes C1_1 to C1_P (where P is a positive integer that is equal to or greater than 2), and an M-th code block CB_M may include Q codes CM_1 to CM_Q (where Q is a positive integer that is equal to or greater than 2).

In an example embodiment, each of the plurality of code blocks CB_1 to CB_M may be a unit for codes to be sequentially executed without waiting for an external resource and/or branching into another code. For example, when, in the first code block CB_1, P-th code C1_P is access code for the external resource, in response to the first code block CB_1 being terminated, another code block, for example, the M-th code block CB_M, may be executed at a point where access to the external resource is possible. In another example, the P-th code C1_P in the first code block CB_1 may be code for conditional statement (or an if-statement) and an operation to be performed when a condition of the conditional statement is satisfied, and the first code CM_1 of another code block, for example, the M-th code block CB_M, may be a code for a code for performing an operation when the condition of the conditional statement is not satisfied (or an operation of an else-statement).

In an example embodiment, during compiling, the monitor associative code may be inserted into each code block. In detail, first monitor associative code MAC_1 may be inserted into the first code block CB_1, and an M-th monitor associative code MAC_M may be inserted into the M-th code block CB_M. In an example, the monitor associative code, for example, MAC_1 or MAC_M, may be monitor codes that are codes for directly monitoring performance characteristics of the corresponding code block. In another example, the monitor associative codes, for example, MAC_1 or MAC_M, may be branch codes that instruct to branch into monitor codes for monitoring the performance characteristics of the code block.

Figure 6:
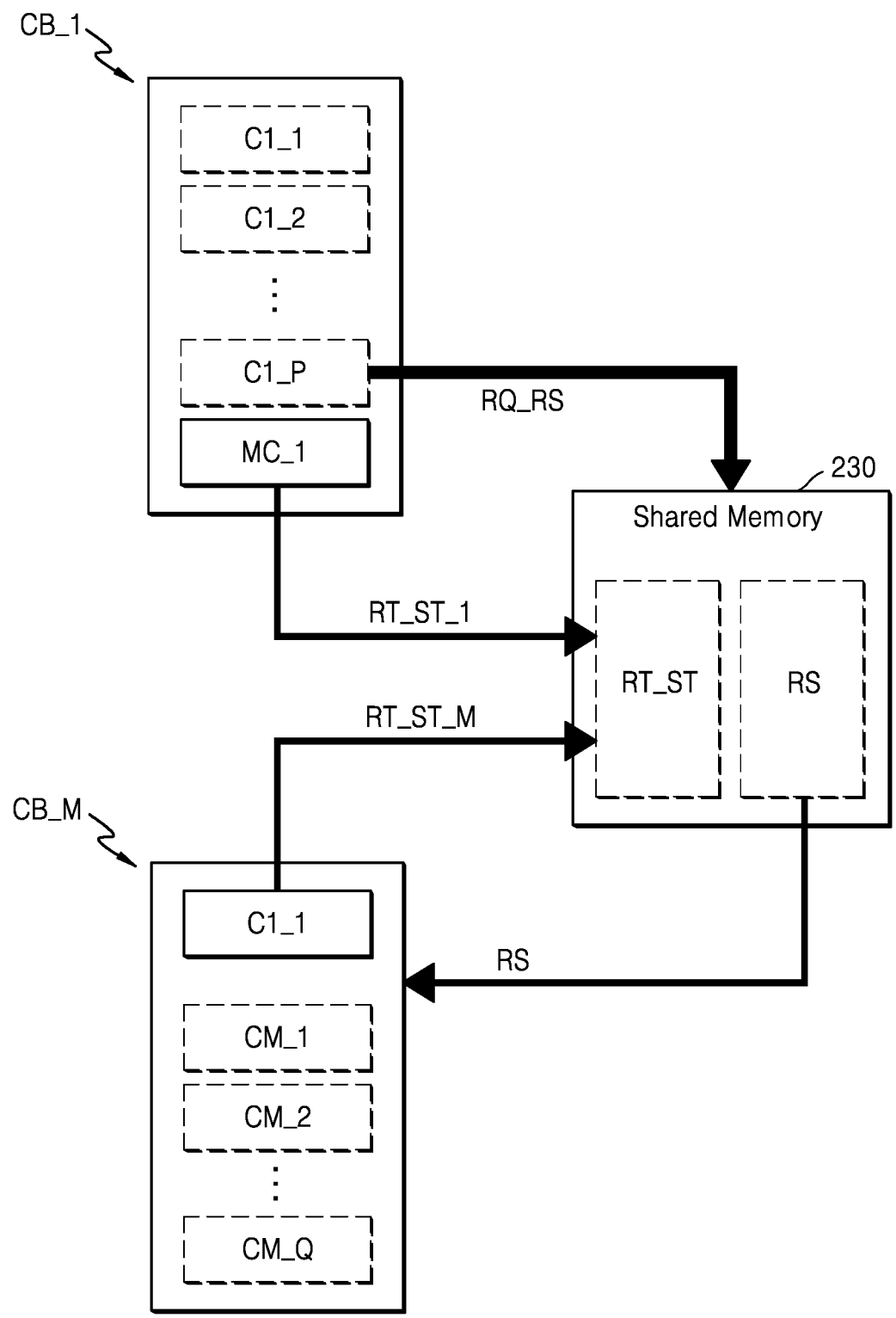
FIG. 6 is a view illustrating a monitoring operation according to an example embodiment.

FIG. 6 is a view illustrating a monitoring operation according to an example embodiment.

Referring to FIG. 6, first monitor code MC_1 as monitor associative code may be inserted into the first code block CB_1, and M-th monitor code MC_M as monitor associative code may be inserted into the M-th code block CB_M. In detail, the first monitor code MC_1 may be a code for directly monitoring runtime performance characteristics of the first code block CB_1, and the M-th monitor code MC_M may be a code for directly monitoring runtime performance characteristics of the M-th code block CB_M. For example, P-th code C1_P of the first code block CB_1 may be access code to a resource RS stored in the shared memory 230. In other words, in response to the P-th code C1_P being executed, a resource request RQ_RS may be input into the shared memory 230.

In an example embodiment, first monitor code MC_1 after the P-th code C1_P may be inserted. For example, the compiler 210 may insert and compile the first monitor code MC_1 after the P-th code C1_P, by using the monitor associative code injector 212, and the first monitor code MC_1 may be executed in a core after the P-th code C1_P is executed.

In an example embodiment, in response to the first monitor code MC_1 being executed, first runtime performance characteristics RT_ST_1 may be derived and recorded as a runtime performance characteristics list RT_ST of the shared memory 230. For example, the first runtime performance characteristics RT_ST_1 may include information about a shader program number, a time stamp, and the types of request resources.

For example, the M-th code block CB_M may include first code CM_1 that use a resource RS accessed according to the resource request RQ_RS. In other words, the first code block CB_1 may request the external resource RS, and the M-th code block CB_M may use the resource RS when the resource RS is available.

In an example embodiment, the M-th monitor code MC_M may be inserted at the starting point of the M-th code block CB_M. For example, the compiler 210 may insert and compile the M-th monitor code MC_M at a position before the first code CM_1 in the M-th code block CB_M, by using the monitor associative code injector 212, and the M-th monitor code MC_M may be executed first among codes of the M-th code block CB_M.

In an example embodiment, in response to the M-th monitor code MC_M being executed, M-th runtime performance characteristics RT_ST_M may be derived and recorded as the runtime performance characteristics list RT_ST of the shared memory 230. For example, the M-th runtime performance characteristics RT_ST_M may include information about a shader program number, a time stamp, and the types of usage resources.

As time stamp information is included in each of the first runtime performance characteristics RT_ST_1 and the M-th runtime performance characteristics RT_ST_M, actual runtime performance characteristics including an available time of the external resource RS may be derived. For example, the resource RS stored in the shared memory 230 may be a shared resource required to drive the plurality of cores 220, for example, a texture.

In the code block CB_1 that requests an access to the external shared resource RS, the first monitor code MC_1 may be inserted at an ending point of the code block, and when the requested resource RS is used in another code block, a monitoring operation of the first monitor code MC_1 may be performed at a waiting time for the resource RS. That is, as the monitoring operation is performed during a time wasted for actual performance, a profile of the shader program may proceed at a comparatively high speed.

Figure 7:
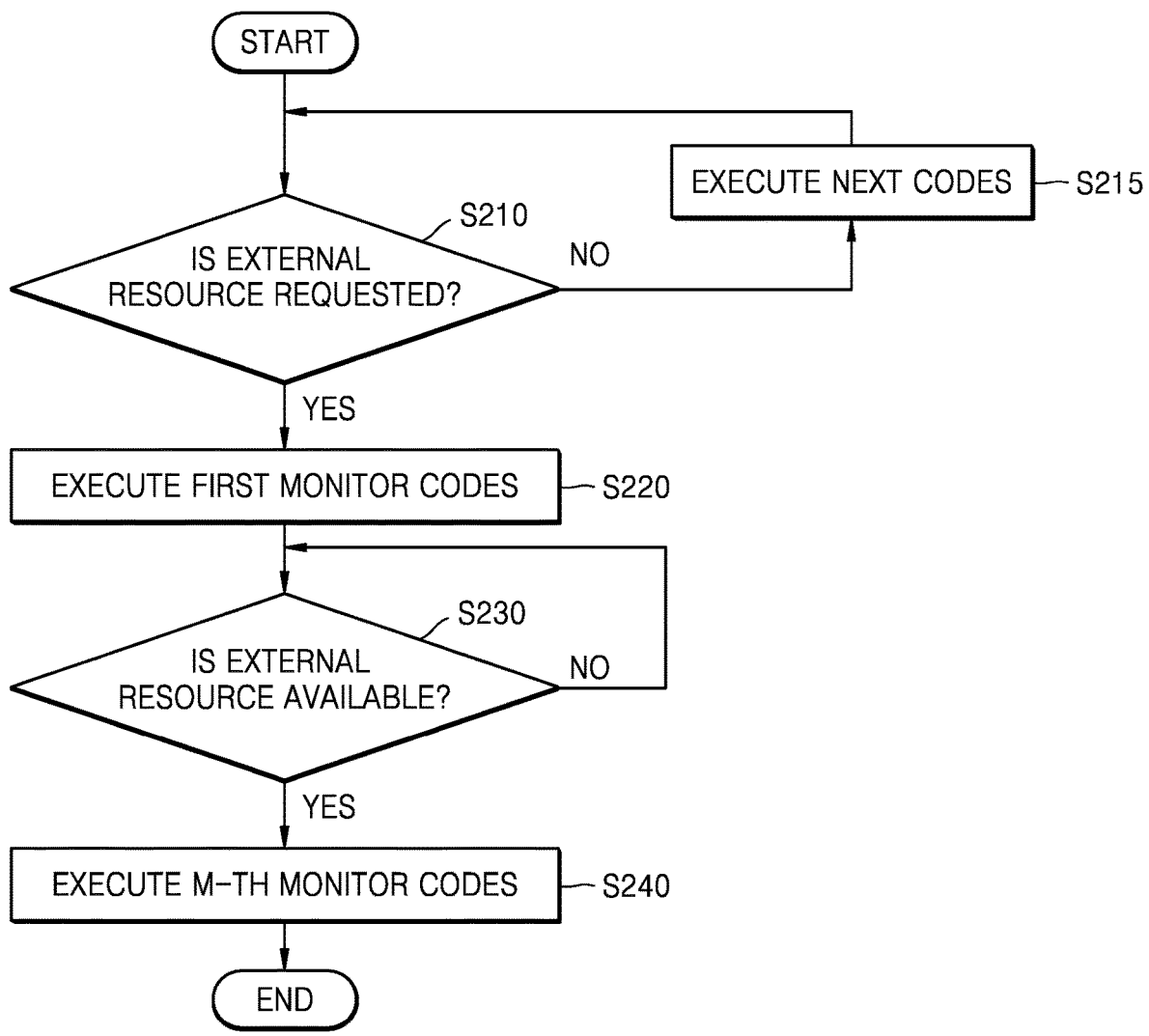
FIG. 7 is a flowchart illustrating an operation of a code block into which monitor codes are inserted, according to an example embodiment.

FIG. 7 is a flowchart illustrating an operation of a code block into which monitor codes are inserted, according to an example embodiment. For example, FIG. 7 may illustrate an operation of the code blocks CB_1 and CB_M shown in FIG. 6.

Referring to FIG. 7, when the first code block CB_1 is performed in a core, it may be determined whether a code for requesting an external resource is executed (operation S210). When the first code block CB_1 is performed in the core and the code for requesting the external resource is not executed, the core may sequentially perform the next code (operation S215).

When the code for requesting the external resource is executed in the core, the core may execute first monitor code MC_1 (operation S220). In an example embodiment, the first monitor code MC_1 may be inserted using the monitor associative code injector 212 included in the compiler 210 in the compiling of the shader program SH. Based on the first monitor code MC_1 being executed in the core, the first runtime performance characteristics of the first code block CB_1 may be derived and recorded in the shared memory 230. In an example embodiment, when the first code block CB_1 includes a code for requesting the external resource RS, the first monitor code MC_1 may be inserted at an ending point of the first code block CB_1.

In response to a code, for example, the P-th code C1_P, for requesting an external resource being executed in the first code block CB_1, the availability of a resource of the M-th code block CB_M that uses the resource RS according to the resource request RQ_RS may be determined (operation S230). Because the resource RS may be requested and used in each of the plurality of cores 220 that are driven in parallel, a certain waiting time may exist from the resource request RQ_RS to availability of the resource RS.

When the external resource RS is available, the core may execute the M-th monitor code MC_M of the M-th code block CB_M (operation S240). In an example embodiment, the M-th monitor code MC_M may be inserted by using the monitor associative code injector 212 included in the compiler 210 in the compiling of the shader program SH. Based on execution of the M-th monitor code MC_M in the core, the M-th runtime performance characteristics RT_ST_M of the M-th code block CB_M may be derived and recorded in the shared memory 230. In an example embodiment, when the M-th code block CB_M includes a code that uses the requested external resource RS, the M-th monitor code MC_M may be inserted at the starting point of the M-th code block CB_M.

Figure 8:
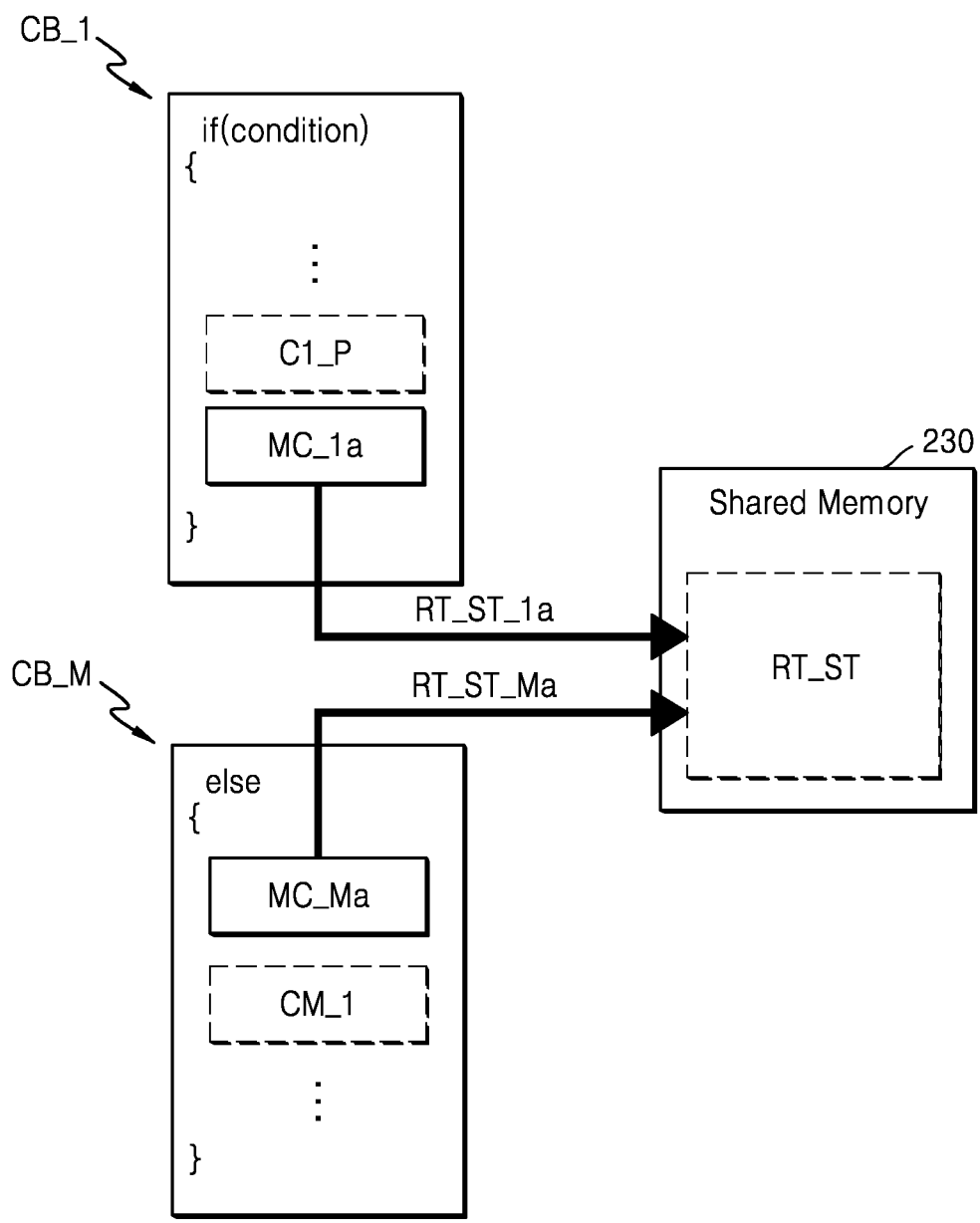
FIG. 8 is a view illustrating a monitoring operation according to another example embodiment.

FIG. 8 is a view illustrating a monitoring operation according to another example embodiment.

Referring to FIG. 8, first monitor code MC_1a as monitor associative code may be inserted into the first code block CB_1a, and M-th monitor code MC_Ma as monitor associative code may be inserted into an M-th code block CB_Ma. For example, the first code block CB_1a may include codes for a conditional statement and an operation to be performed when a condition of the conditional statement is satisfied. In detail, the first code block CB_1a may include codes for an if-statement and an operation to be performed when a condition of the if-statement is satisfied.

In an example embodiment, the first monitor code MC_1a after P-th code C1_Pa that is last code among codes for the performance operation when the condition is satisfied, may be inserted. For example, the compiler 210 may insert and compile the first monitor code MC_1a after the P-th code C1_Pa using the monitor associative code injector 212, and the first monitor code MC_1a may be executed in a core after the P-th code C1_Pa is executed.

In an example embodiment, the first runtime performance characteristics RT_ST_1a may be derived according to performance of the first monitor code MC_1a and may be recorded as the runtime performance characteristics list RT_STa of a shared memory 230a. For example, the first runtime performance characteristics RT_ST_1a may include information that corresponds to a shader program number, a time stamp, and satisfaction of a condition of a conditional statement.

For example, the M-th code block CB_Ma may include codes for the performance operation when a condition of the conditional statement of the first code block CB_1a is not satisfied. In detail, the M-th code block CB_Ma may include codes for performing an operation corresponding to an else-statement.

In an example embodiment, the M-th monitor code MC_Ma may be inserted at the starting point of the M-th code block CB_Ma. For example, the compiler 210 may insert and compile the M-th monitor code MC_Ma at a position before the first code CM_1a in the M-th code block CB_Ma, by using the monitor associative code injector 212, and the M-th monitor code MC_Ma may be executed first among the codes of the M-th code block CB_Ma.

In an example embodiment, the M-th runtime performance characteristics RT_ST_Ma may be derived according to execution of the M-th monitor code MC_Ma and may be recorded as the runtime performance characteristics list RT_STa of the shared memory 230a. For example, the M-th runtime performance characteristics RT_ST_Ma may include information that corresponds to a shader program number, a time stamp, and non-satisfaction of a condition of a conditional statement.

Figure 9:
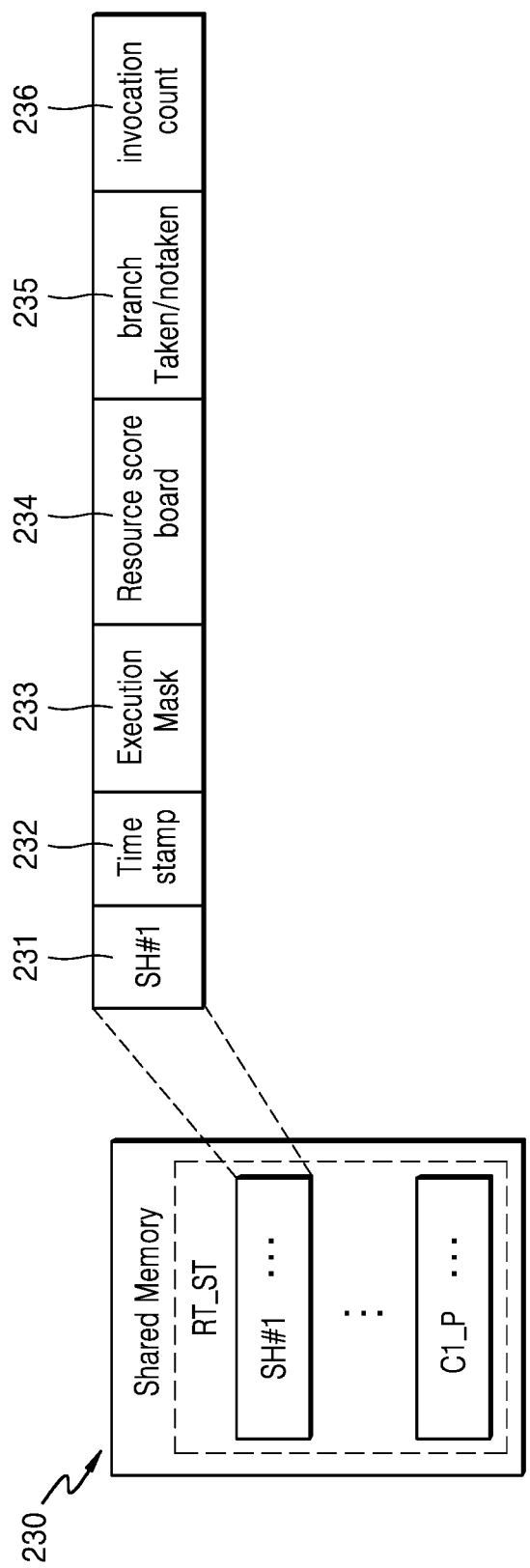
FIG. 9 is a view illustrating a runtime performance characteristics list according to an example embodiment.

FIG. 9 is a view illustrating a runtime performance characteristics list according to an example embodiment.

Referring to FIG. 9, a runtime performance characteristics list RT_ST may be stored in the shared memory 230. The runtime performance characteristics list RT_ST may include shader runtime performance characteristics SH_ST1 to SH_STK (where K is a positive integer that is equal to or greater than 2) for each of the plurality of shader programs. In an example embodiment, each of the shader runtime performance characteristics SH_ST1 to SH_STK may include a runtime performance characteristic list, for example, RT_ST_1 or RT_ST_M of FIG. 6, for code blocks.

In an example embodiment, each of the shader runtime performance characteristics SH_ST1 to SH_STK may include a shader program number 231, a time stamp 232, mask execution 233, a resource score board 234, satisfaction/non-satisfaction of branching conditions 235, and an invocation count 236. For example, the shader program number 231 may include a render index and draw call information.

Although not shown in the drawings, each of the shader runtime performance characteristics SH_ST1 to SH_STK may include a statistics value regarding invocation of commands. For example, each of the shader runtime performance characteristics SH_ST1 to SH_STK may include the number of times the commands are invoked, the number of times an arithmetic logic unit (ALU) is used, the number of times a shared memory is accessed, the number of times of pipeline stall and a reason thereof.

Although not shown in the drawings, each of the shader runtime performance characteristics SH_ST1 to SH_STK may include information related to synchronization. For example, each of the shader runtime performance characteristics SH_ST1 to SH_STK may include a shared memory waiting time, a delay time due to a synchronization primitive, and a performance time of an atomic instruction.

Figure 10:
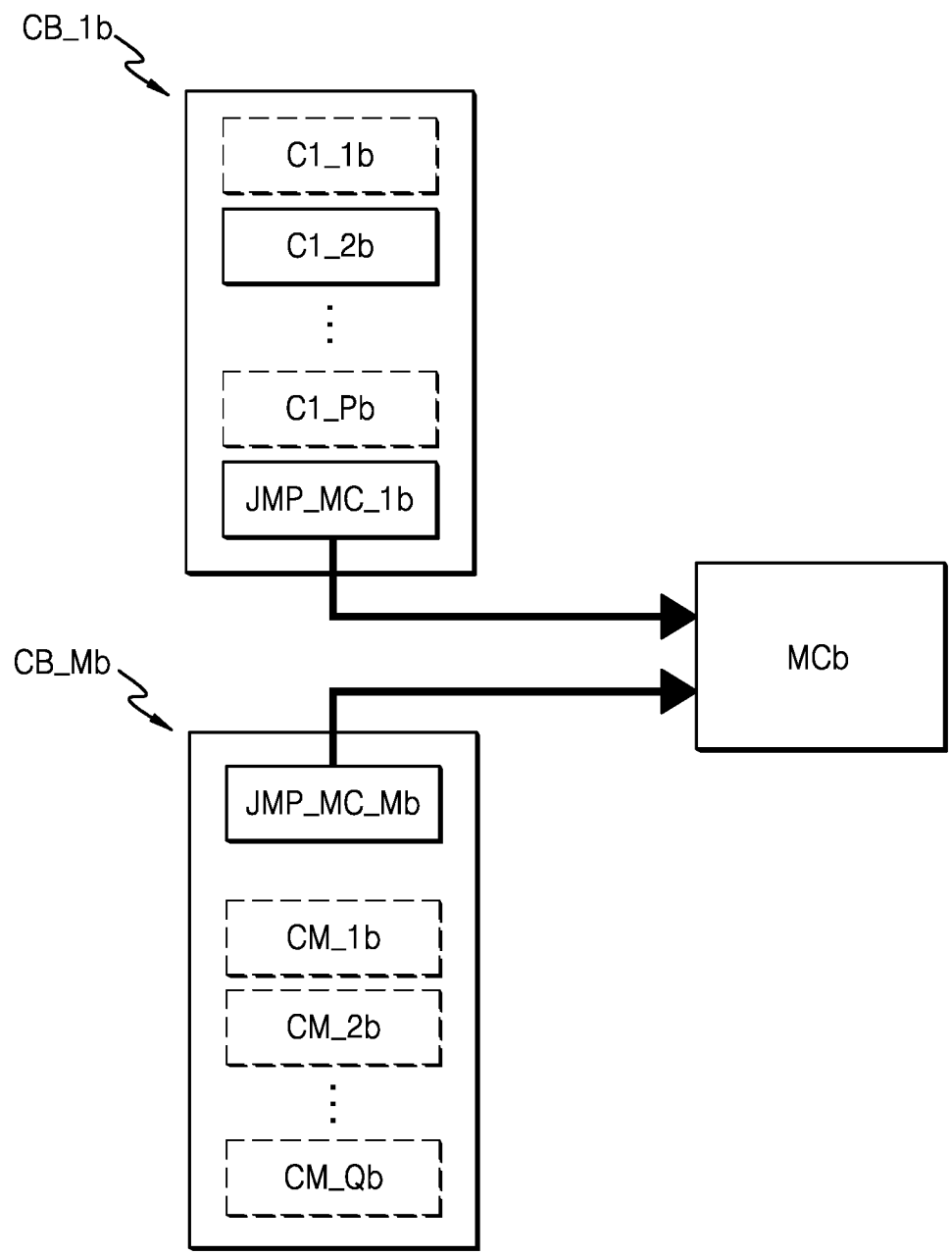
FIG. 10 is a view illustrating a monitoring operation according to another example embodiment.

FIG. 10 is a view illustrating a monitoring operation according to another example embodiment.

Referring to FIG. 10, first branch code JMP_MC_1b as monitor associative code may be inserted into the first code block CB_1b, and M-th branch code JMP_MC_Mb as monitor associative code may be inserted into the M-th code block CB_Mb. In detail, each of the first branch code JMP_MC_1b and the second branch code JMP_MC_Mb may be branch codes that instruct to branch into general purpose monitor code MCb for monitoring performance characteristics of a code block. For example, P-th code C1_Pb of the first code block CB_1b may be access code to the resource RS stored in the shared memory 230, as described in FIG. 6. However, embodiments are not limited thereto. The first code block CB_1b may include codes for performing an operation when a condition of a conditional statement is satisfied, as described above in FIG. 8.

In an example embodiment, the first branch code JMP_MC_1b may be inserted after the P-th code C1_Pb. For example, the compiler 210 may insert and compile the first branch code JMP_MC_1b after the P-th code C1_Pb by using the monitor associative code injector 212, and the first branch code JMP_MC_1b may be executed in a core after the P-th code C1_Pb is executed. Based on execution of the first branch code JMP_MC_1b, the general purpose monitor code MCb may be executed. In an example embodiment, based on execution of the general purpose monitor code MCb with respect to the first code block CB_1b, runtime performance characteristics on the first code block CB_1b may be derived and recorded in the shared memory (for example, see 230 of FIG. 6).

For example, the first code CM_1b of the M-th code block CB_Mb may be a code that uses the resource RS, as described above in FIG. 6. However, embodiments are not limited thereto. The M-th code block CB_Mb may include codes for performing an operation when a condition of the conditional statement included in the first code block CB_1b is satisfied, as described above in FIG. 8.

In an example embodiment, the M-th branch code JMP_MC_Mb may be inserted at the starting point of the M-th code block CB_Mb. For example, the compiler 210 may insert and compile the M-th branch code JMP_MC_Mb at a position before the first code CM_1b in the M-th code block CB_Mb by using the monitor associative code injector 212, and the M-th branch code JMP_MC_Mb may be executed first among codes of the M-th code block CB_Mb. Based on execution of the M-th branch code JMP_MC_Mb, the general purpose monitor code MCb may be executed. In an example embodiment, based on execution of the general purpose monitor code MCb with respect to the M-th code block CB_Mb, runtime performance characteristics on the M-th code block CB_Mb may be derived and recorded in a shared memory (for example, see 230 of FIG. 6).

Figure 11:
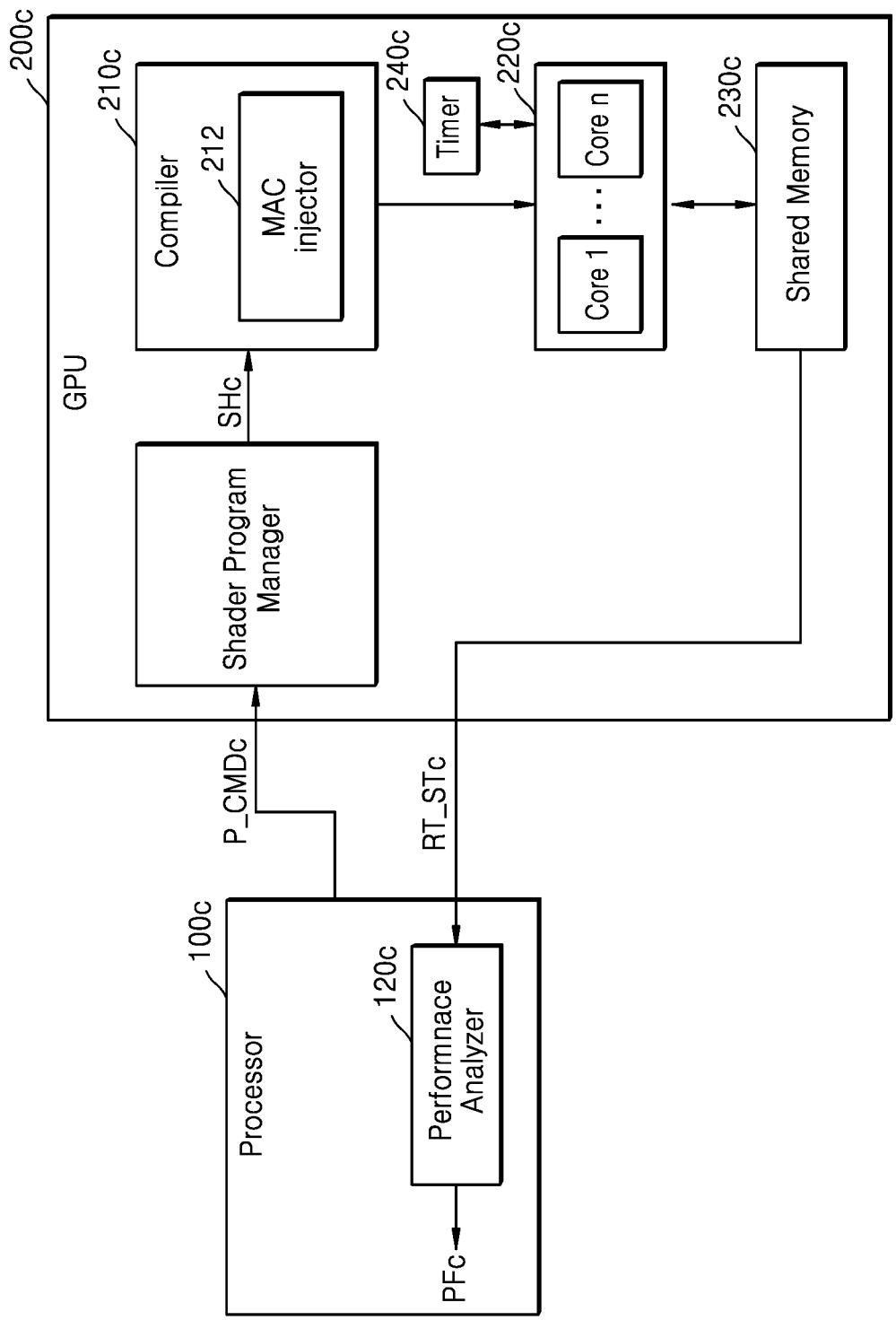
FIG. 11 is a block diagram illustrating an operation in a profile mode according to another example embodiment.

FIG. 11 is a block diagram illustrating an operation in a profile mode according to another example embodiment. A description of a redundant configuration in view of the descriptions with reference to FIG. 2 is omitted.

Referring to FIG. 11, a shader program manager 205c may be included in a GPU 200c. For example, the processor 100c may output a profile mode command P_CMDc to the GPU 200c, and the shader program manager 205c may output a shader program SHc to a compiler 210c in response to the profile mode command P_CMDc. Thus, the GPU 200c may output a runtime performance characteristics list RT_STc including runtime performance characteristics about each of shader programs in response to the profile mode command P_CMDc. The processor 100c may generate, by using the performance analyzer 120c, performance data PFc based on the runtime performance characteristics list RT_STc that is output in response to the profile mode command P_CMDc.

Figure 12:
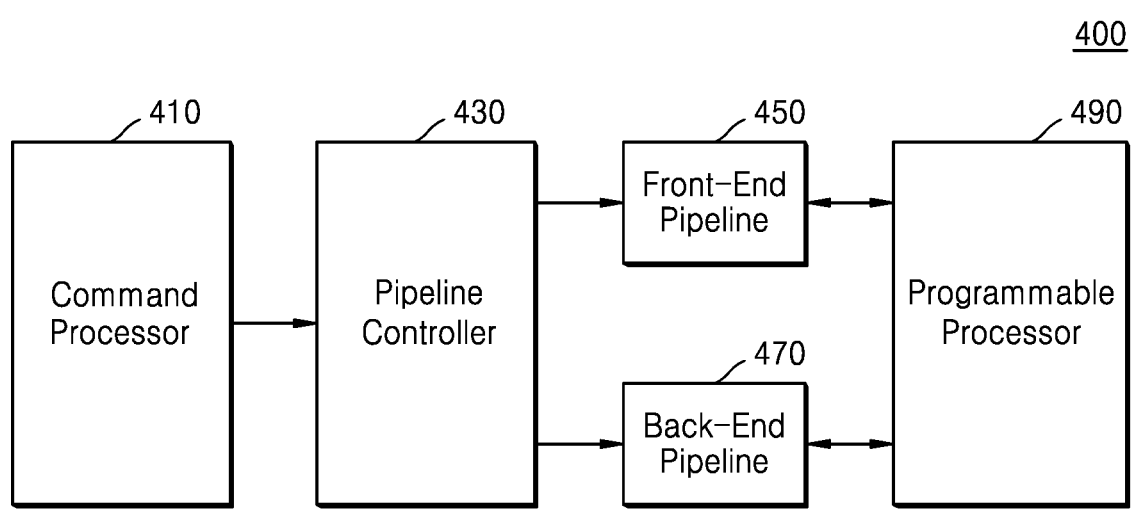
FIG. 12 is a block diagram illustrating a graphics processor according to an example embodiment.

FIG. 12 is a block diagram illustrating a graphics processor according to an example embodiment. As shown in FIG. 12, a GPU 400 may include a command processor 410, a pipeline controller 430, a front-end pipeline 450, a back-end pipeline 470, and a programmable processor 490.

The command processor 410 may receive a command from a host, may interpret the received command, thereby converting the command into a command that may be processed by a pipeline. The command processor 410 may provide the converted command to the pipeline controller 430.

The pipeline controller 430 may extract information required in the front-end pipeline 450 and the back-end pipeline 470 from the command received from the command processor 410 and may perform a pipeline configuration based on the extracted information. Also, the pipeline controller 430 may convert the command received from the command processor 410 into a command that may be processed by the front-end pipeline 450 and the back-end pipeline 470 and may provide the converted command to the front-end pipeline 450 and the back-end pipeline 470.

According to example embodiments, the GPU 400 may insert a plurality of monitor associative codes into a shader program during compiling in a profile mode, as described above in FIGS. 1 through 11. Thus, runtime performance characteristics in which a real program driving environment is reflected, may be easily monitored, and the result of monitoring may be obtained.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A computing system comprising:
   a memory configured to store a shader program including a plurality of code blocks; and
   a graphics processing unit (GPU) configured to obtain the shader program stored in the memory in a profile mode, the GPU being configured to perform:
   inserting, into the shader program, one or more monitor associative codes;
   compiling the shader program, into which the one or more monitor associative codes are inserted, into a language that is capable of being processed by a plurality of cores; and
   obtaining a runtime performance characteristic of the shader program by executing the compiled shader program and the one or more monitor associative codes, wherein each of the plurality of code blocks includes a plurality of codes to be sequentially executed, wherein a first code block among the plurality of code blocks comprises a first code for requesting a resource shared by at least two or more cores of the plurality of cores, and the inserting comprises inserting a first monitor associative code at a position after the first code, the first monitor associative code and the first code being last codes in the first code block, and wherein the obtaining the runtime performance characteristic comprises:

requesting the resource by executing the first code; and obtaining a runtime performance characteristic of the first code block by executing the first monitor associative code in a waiting time period until when the requested resource is available, the first code block being terminated at a time when the requested resource is available.

2. The computing system of claim 1, wherein the inserting comprises inserting the one or more monitor associative codes into each of at least part of the plurality of code blocks.

3. The computing system of claim 2, wherein a second code block among the plurality of code blocks comprises a second code for using the resource, and the inserting comprises inserting a second monitor associative code at a starting point of the second code block.

4. The computing system of claim 2, wherein a third code block among the plurality of code blocks comprises a conditional statement and a code for performing an operation when a condition of the conditional statement is satisfied, and the inserting comprises inserting a third monitor associative code at an ending point of the third code block.

5. The computing system of claim 4, wherein the obtaining the runtime performance characteristic comprises obtaining a runtime performance characteristic of the third code block by executing the third monitor associative code, and the runtime performance characteristic of the third code block comprises information about at least one of a shader program number, a time stamp generated based on a performance time of the third code block, or satisfaction of the conditional statement.

6. The computing system of claim 4, wherein a fourth code block among the plurality of code blocks comprises a code for performing an operation when the condition of the conditional statement is not satisfied, and the inserting comprises inserting a fourth monitor associative code at a starting time of the fourth code block.

7. The computing system of claim 6, wherein the obtaining the runtime performance characteristic comprises obtaining a runtime performance characteristic of the fourth code block by executing the fourth monitor associative code, and the runtime performance characteristic of the fourth code block comprises information about at least one of a shader program number, a time stamp generated based on a performance time of the fourth code block, and non-satisfaction of the conditional statement.

8. The computing system of claim 1, wherein the runtime performance characteristic of the first code block comprises information about at least one of a shader program number, a time stamp generated based on a performance time of the first code block, or the resource.

9. The computing system of claim 1, wherein the GPU further comprises a shared memory configured to store the resource shared by the at least two or more cores of the plurality of cores, and the obtaining the runtime performance characteristic comprises storing the obtained runtime performance characteristic in the shared memory.

10. The computing system of claim 9, wherein the GPU is further configured to output the runtime performance characteristic stored in the shared memory according to termination of execution of the shader program.

11. The computing system of claim 1, wherein the one or more monitor associative codes comprise a monitor code for directly monitoring a performance characteristic of a code block into which the one or more monitor associative codes are inserted.

12. The computing system of claim 1, wherein the one or more monitor associative codes comprise a branch code that instructs to branch into a general purpose monitor code, the general purpose monitor code being used for monitoring a performance characteristic of a code block.

13. A method of operating a computing system, the method comprising:

outputting a shader program including a plurality of code blocks, in response to a profile command including a graphics command;

inserting monitor associative codes into each of at least part of the plurality of code blocks;

compiling the shader program, into which the monitor associative codes are inserted;

obtaining a runtime performance characteristic of the shader program by executing the plurality of code blocks and the monitor associative codes in a plurality of cores;

recording the obtained runtime performance characteristic of the shader program in a memory shared by the plurality of cores; and outputting the recorded runtime performance characteristic of the shader program in response to termination of the shader program, wherein each of the plurality of code blocks includes a plurality of codes to be sequentially executed, wherein a first code block among the plurality of code blocks comprises a first code for requesting a resource shared by at least two or more cores of the plurality of cores, and the inserting comprises inserting a first monitor associative code at a position after the first code, the first monitor associative code and the first code being last codes in the first code block, and wherein the obtaining the runtime performance characteristic comprises:

requesting the resource by executing the first code; and obtaining a runtime performance characteristic of the first code block by executing the first monitor associative code in a waiting time period until when the requested resource is available, the first code block being terminated at a time when the requested resource is available.

14. The method of claim 13, wherein the obtaining comprises generating a time stamp that corresponds to a performance time of a code block including the monitor associative codes according to execution of the monitor associative codes.

15. The method of claim 13, further comprising generating performance data about the shader program based on the output runtime performance characteristic of the shader program.

16. The method of claim 15, wherein the generating comprises analyzing at least one of a total performance time of the shader program, efficiency of the shader program, instruction issue-efficiency, and a statistics value regarding whether a branching condition is satisfied for each branch point, based on the output runtime performance characteristic of the shader program.

17. The method of claim 13, wherein the runtime performance characteristic of the shader program comprise information about at least one of a shader program number, a time stamp, mask execution, a resource score board, branch condition satisfaction/non-satisfaction, and an invocation count.

18. A graphics processing unit (GPU) comprising:
a compiler configured to obtain a program including a plurality of code blocks, the compiler comprising a monitor associative code injector configured to insert one or more monitor associative codes into each of at least part of the plurality of code blocks, and configured to compile the one or more monitor associative codes and the program in a profile mode;
a plurality of cores configured to perform the compiled program and the one or more monitor associative codes in a parallel manner and configured to obtain a runtime performance characteristic of the program based on execution of the one or more monitor associative codes; and
a shared memory configured to store the obtained runtime performance characteristic of the program,
wherein each of the plurality of code blocks includes a plurality of codes to be sequentially executed,
wherein a first code block among the plurality of code blocks comprises a first code for requesting a resource shared by at least two or more cores of the plurality of cores, and the inserting comprises inserting a first monitor associative code at a position after the first code, the first monitor associative code and the first code being last codes in the first code block, and
wherein a first core of the at least two or more cores is configured to request the resource by executing the first code and obtain a runtime performance characteristic of the first code block by executing the first monitor associative code in a waiting time period until when the requested resource is available, the first code block being terminated at a time when the requested resource is available.

* * * * *